US008009327B2

(12) United States Patent
Ishikawa

(10) Patent No.: US 8,009,327 B2
(45) Date of Patent: Aug. 30, 2011

(54) METHOD AND APPARATUS FOR IMAGE PROCESSING

(75) Inventor: Hisashi Ishikawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 1281 days.

(21) Appl. No.: 10/611,948

(22) Filed: Jul. 3, 2003

(65) Prior Publication Data

US 2004/0010633 A1 Jan. 15, 2004

(30) Foreign Application Priority Data

Jul. 11, 2002 (JP) ................................ 2002-203112
Jan. 24, 2003 (JP) ................................ 2003-016713
May 8, 2003 (JP) ................................ 2003-130539

(51) Int. Cl.
*G06F 3/00* (2006.01)
*G06K 15/00* (2006.01)

(52) U.S. Cl. ...... 358/3.03; 358/1.9; 358/3.04; 358/3.01; 358/3.13; 358/3.06; 358/523; 358/518; 358/519; 358/520; 382/270; 382/267; 710/1

(58) Field of Classification Search ................. 358/3.03, 358/1.9, 3.01, 3.04, 3.13, 3.06, 523, 518–520; 382/270, 267; 710/1
See application file for complete search history.

(56) References Cited

U.S. PATENT DOCUMENTS 4,891,710 A 1/1990 Nakazato et al. ............ 358/443
4,969,052 A 11/1990 Ishida
5,159,470 A 10/1992 Ishida
5,488,673 A * 1/1996 Katayama et al. ............ 382/270
5,530,561 A 6/1996 Shimazaki
5,805,738 A 9/1998 Kaburagi et al. ............. 382/251
6,330,075 B1 * 12/2001 Ishikawa ........................ 358/1.9
6,956,674 B1 * 10/2005 Ishikawa ...................... 358/3.03
6,977,756 B2 * 12/2005 Nakano et al. ............... 358/3.03
2009/0195493 A1 * 8/2009 Fujiyoshi ...................... 345/100

FOREIGN PATENT DOCUMENTS

JP 1-284172 11/1989
JP 5-075863 3/1993
JP 6-66876 8/1994

(Continued)

OTHER PUBLICATIONS

R. Floyd, et al., "An Adaptive Algorithm for Spatial Grey Scale", Society for Information Display, 1975, pp. 36.

(Continued)

*Primary Examiner* — David K Moore
*Assistant Examiner* — Quang N Vo
(74) *Attorney, Agent, or Firm* — Fitzpatrick, Cella, Harper & Scinto

(57) ABSTRACT

This disclosure relates to decreasing the required buffer memory capacity while reducing the impact of an arithmetic error in error diffusion processing. A quantization circuit (4) quantizes input image data and outputs an output code. The quantization error generated in the quantization circuit (4) is calculated by an inverse quantization circuit (5) and subtracter (6). The calculated quantization error is stored in a buffer (8). Since the buffer (8) only needs to have a size capable of storing the quantization error, the size can be made smaller than before. A diffusion filter (9) diffuses the quantization error using a quantization error or the like, which is stored in the buffer (8). A latch (3) and bit connector (1) can usefully reduce the impact of an arithmetic error in error diffusion processing on the next input image data.

13 Claims, 10 Drawing Sheets

FOREIGN PATENT DOCUMENTS

| | | |
|---|---|---|
| JP | 7-22334 | 3/1995 |
| JP | 7-93682 | 10/1995 |
| JP | 7-288689 | 10/1995 |
| JP | 9-179974 | 7/1997 |
| JP | 9-214760 | 8/1997 |
| JP | 10-42132 | 2/1998 |
| JP | 10-42133 | 2/1998 |
| JP | 10-257341 | 9/1998 |
| JP | 11-88693 | 3/1999 |
| JP | 11-146201 | 5/1999 |
| JP | 11-328389 | 11/1999 |
| JP | 2001-111831 | 4/2001 |

OTHER PUBLICATIONS

Japanese Office Action dated Feb. 22, 2008 issued in Japanese counterpart application No. 2003-130539.

* cited by examiner

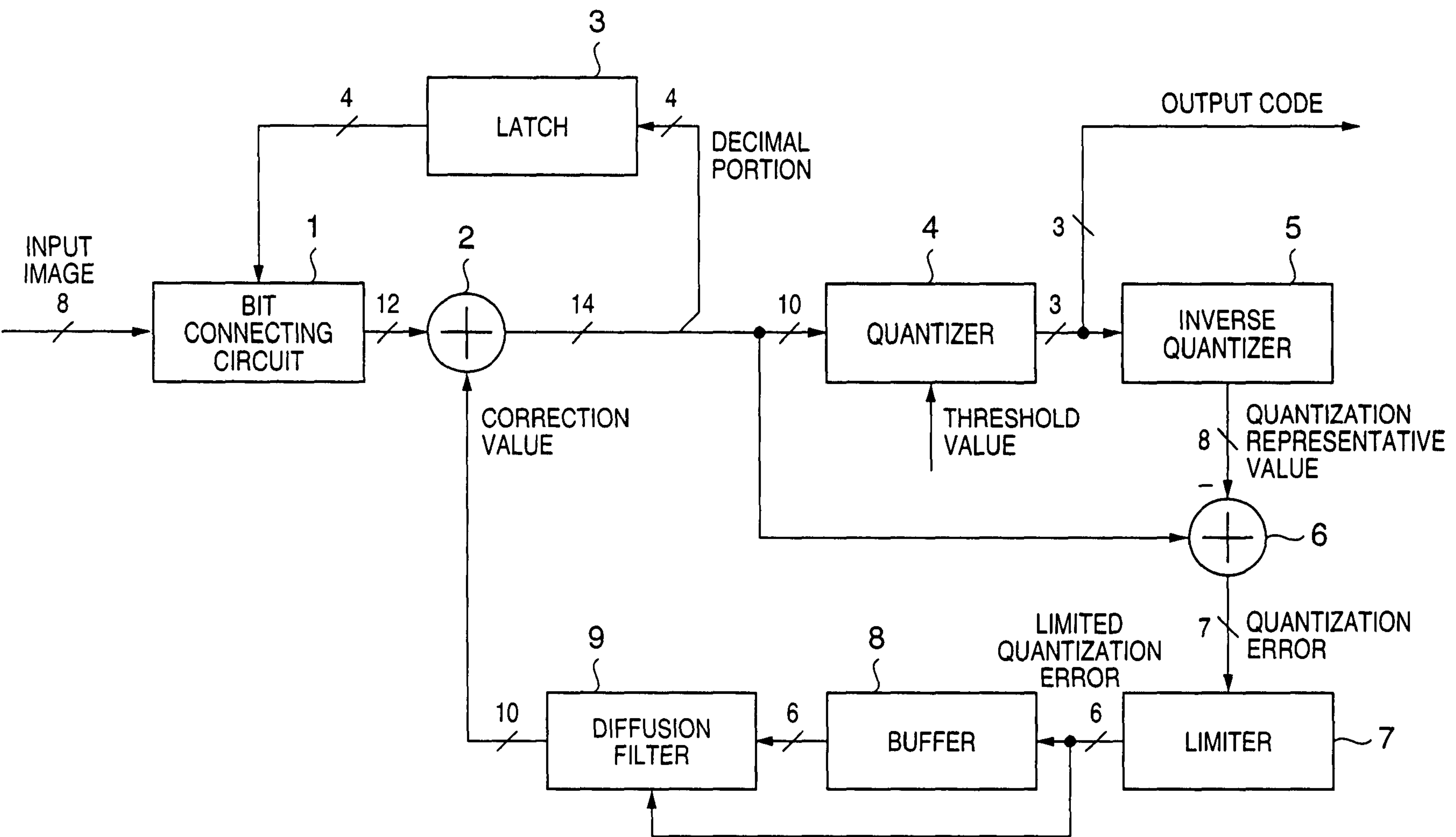
F I G. 1
INPUT IMAGE
8
BIT CONNECTING CIRCUIT
1
LATCH
3
4
4
DECIMAL PORTION
12
2
14
CORRECTION VALUE
10
QUANTIZER
4
THRESHOLD VALUE
3
3
OUTPUT CODE
INVERSE QUANTIZER
5
QUANTIZATION REPRESENTATIVE VALUE
8
−
6
QUANTIZATION ERROR
7
LIMITER
7
LIMITED QUANTIZATION ERROR
6
BUFFER
8
6
DIFFUSION FILTER
9
10

FIG. 2

| | | |
|---|---|---|
| $\frac{1}{16}$ | $\frac{5}{16}$ | $\frac{3}{16}$ |
| $\frac{7}{16}$ | * | |

INPUT IMAGE
8
INTEGRAL PORTION
11
9
m
BIT CONNECTING CIRCUIT
11
4
DECIMAL PORTION
4+m
13
LATCH
13
4+m
LOWER BITS
12
CORRECTION VALUE
14
HIGHER BITS
10−m
QUANTIZER
14
3
OUTPUT CODE
INVERSE QUANTIZER
15
3
−
16
HIGHER BITS
10−m
QUANTIZATION ERROR OF HIGHER BITS
7−m
LIMITER
17
6−m
BUFFER
18
6−m
DIFFUSION FILTER
19
10−m

FIG. 5

| $\frac{0}{16}$ | $\frac{11}{16}$ | $\frac{0}{16}$ |
|---|---|---|
| $\frac{5}{16}$ | * | |

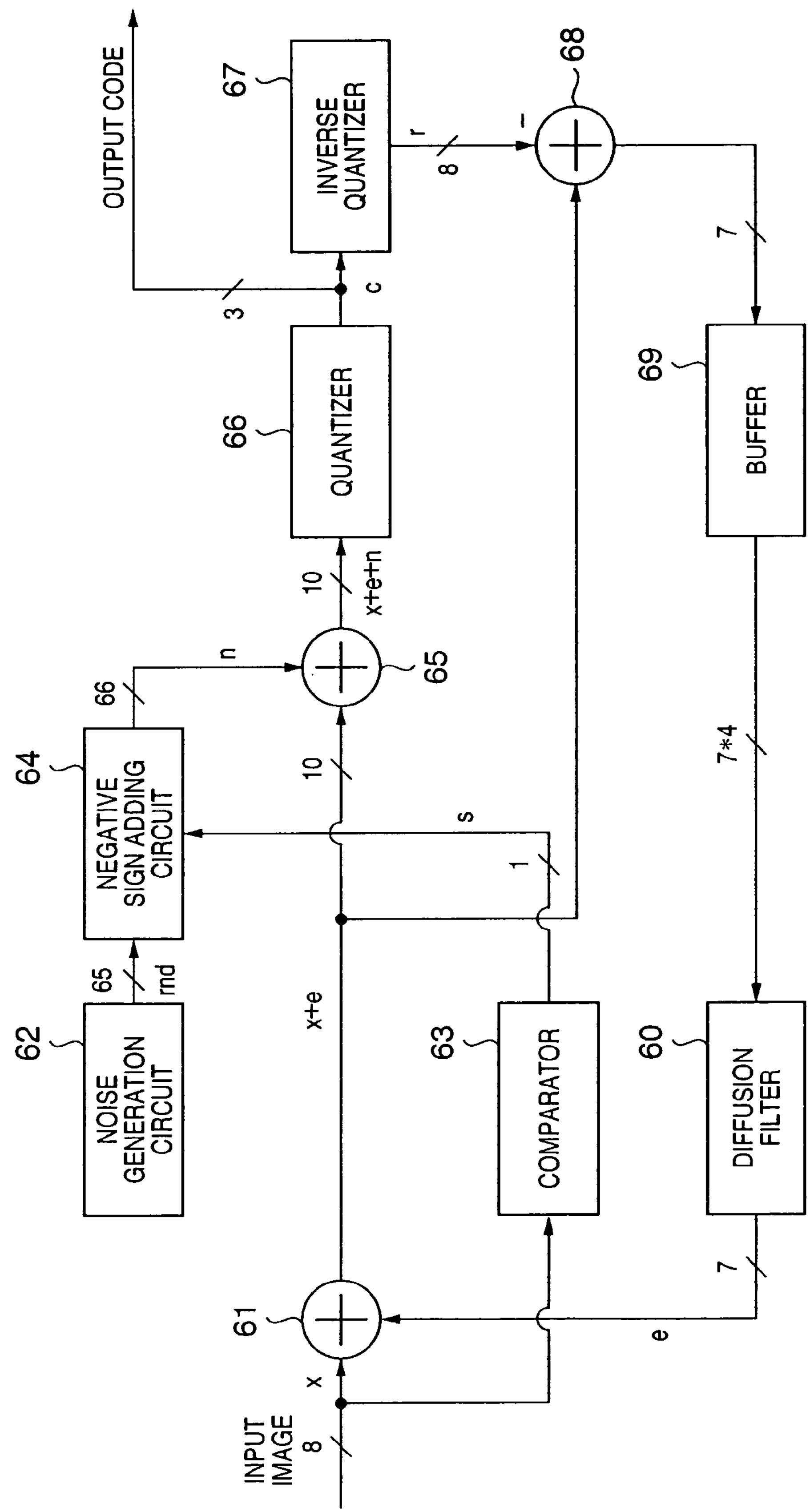
F I G. 6
INPUT IMAGE
8
x
61
e
7
62
NOISE GENERATION CIRCUIT
65
rnd
64
NEGATIVE SIGN ADDING CIRCUIT
66
n
65
10
x+e
63
COMPARATOR
60
DIFFUSION FILTER
s
1
7*4
10
x+e+n
66
QUANTIZER
69
BUFFER
3
c
OUTPUT CODE
67
INVERSE QUANTIZER
r
8
68
−
7

NOISE GENERATION CIRCUIT
62
GAIN ADJUSTMENT CIRCUIT
94
NEGATIVE SIGN ADDING CIRCUIT
64
INPUT IMAGE
8
x
61
x+e
65
x+e+n
n
10
6
5
QUANTIZER
66
INVERSE QUANTIZER
67
OUTPUT CODE
c
3
r
8
68
COMPARATOR
63
s
1
DIFFUSION FILTER
60
BUFFER
69
e
7
7*4

1000
INPUT DEVICE
SCANNER, DIGITAL CAMERA, ETC
1010
MPU
BINARIZATION PROCESSING DEVICE
ROM
1060
OUTPUT DEVICE
MPU
ROM
INKJET PRINTER ETC
1020
MONITOR
1030
KEYBOARD
1040
SW
1050

METHOD AND APPARATUS FOR IMAGE PROCESSING

FIELD OF THE INVENTION

The present invention relates to a method and apparatus for image processing and, more particularly, to an image processing method and apparatus for quantizing input data into binary or multilevel data while storing the difference between an input image density and an output image density by an error diffusion method.

BACKGROUND OF THE INVENTION

To express input multilevel data as binary data or as multilevel data of fewer levels than that of the input binary data, pseudo halftone processing is conventionally used. As an example of the pseudo halftone processing, an error diffusion method is known. This error diffusion method is published in "An Adaptive Algorithm for Spatial Gray Scale" in Society for Information Display 1975 Symposium Digest of Technical Papers, 1975, 36. In this method, let P be the pixel of interest, v be the density of the pixel, v0, v1, v2, and v3 be the densities of pixels P0, P1, P2, and P3 which are present in the neighborhood of the pixel of interest P before binarization processing, and T be the threshold value to be used for binarization. A binarization error E at the point of interest P is weighted using weight coefficients W0, W1, W2, and W3 that are empirically obtained and distributed to the neighboring pixels P0, P1, P2, and P3. That is, this method macroscopically equalizes the average density of the output image and the density of the input image. When output binary data is represented by o, errors E0, E1, E2, and E3 for the neighboring pixels P0, P1, P2, and P3 can be obtained by the following equations.

When $v \geqq T$, $o=1$ and $E=v-V\max$

When $v<T$, $o=0$ and $E=v-V\min$ (where Vmax designates maximum density and Vmin designates minimum density)

$E0=E\times W0;$ $E1=E\times W1;$ $E2=E\times W2;$ $E3=E\times W3;$ (Examples of weight coefficients: $W0=7/16$, $W1=1/16$, $W2=5/16$, and $W3=3/16$)

An error buffer is necessary for propagating the errors. Note that the weight coefficients are decimals of 1 or less, as is apparent from the above example.

Accordingly, in the above examples of the weight coefficients, if the number of bits of an input image is 8, and the threshold value of binarization is fixed at 128, the quantization error is −127 to 127. Hence, the number of bits of the error buffer must be as large as 12, which is disadvantageous.

Japanese Patent Publication Nos. 06-066876 and 07-022334 disclose methods of solving this problem, in which the sum of error distribution values that are obtained by dropping the decimal portions of the products that are obtained by multiplying a binarization error by weight coefficients is obtained, with the residual error calculated from the difference between that sum and the binarization error and re-distributed to the neighboring pixels.

Japanese Patent Publication No. 07-093682 discloses another method, in which n lower bits are extracted from a binarization error, 0s are set in the n lower bits of the binarization error, the obtained binarization error is multiplied by weight coefficients to obtain error distribution values, and the n lower bits extracted from the binarization error are added to one of the error distribution values and distributed to the neighboring pixels.

Japanese Patent Laid-Open No. 05-075863 discloses still another method, in which the higher bits of a binarization error are stored in a buffer memory and the lower bits of the binarization error are latched and added to the next pixel.

In the methods disclosed in Japanese Patent Publication Nos. 06-066876 and 07-022334, however, the sum of error distribution values must be obtained, and the residual error must be calculated on the basis of the difference between the sum and the binarization error.

In the method disclosed in Japanese Patent Publication No. 07-093682, no residual error needs to be calculated. However, since the bit accuracy of the binarization error to be used for error distribution calculation drops, the distribution ratio changes depending on the magnitude of the binarization error. In the above example of weighted coefficients, to nullify the residual error, four lower bits of the binarization error are set to 0, and the binarization error is multiplied by the coefficients. If the binarization error is 15 or less, all bits become 0, and the entire binarization error is distributed to a specific pixel.

In the method disclosed in Japanese Patent Laid-Open No. 05-075863, since higher bits of the binarization error are stored in the buffer memory, the buffer memory capacity can be greatly decreased. However, since the bit accuracy of the binarization error to be used for error distribution calculation drops, as in the method disclosed in Japanese Patent Publication No. 07-093682, the distribution ratio changes depending on the magnitude of the binarization error. In the above example of weight coefficients, to nullify the residual error, four higher bits of the binarization error must be stored in the buffer memory, and four lower bits must be stored in the latch. Since the binarization error is 15 or less, all bits become 0, and the entire binarization error is distributed to the next pixel. If five or more higher bits are stored in the buffer memory to increase the error distribution accuracy, an error is generated due to rounding. Furthermore, Japanese Patent Laid-Open No. 05-075863 teaches that, for a binarization error, "the lower bits are stored in the latch circuit 4 after sign extension". However, when lower bits of a negative binarization error are sign-extended, 1 must be added to the higher bits.

For example, "−1" is expressed by "11111111" in 8-bit binary. When this value is divided into four higher bits "1111" and four lower bits "1111", the lower bits can be sign-extended to "11111" that represents "−1". However, the higher bits "1111" indicates "11110000" that represents "−16". Hence, the sum of the higher- and lower bits represents "−17". To prevent this mismatch, "1" must be added to the higher bits "1111" to set "0000" (the carry is not taken into consideration). In addition, since the lower bits of the binarization error are added to the input pixel data, the range of the binarization error is extended, resulting in an increase of 1 bit. For example, assume that the four lower bits of a binarization error are to be latched. A normal binarization error ranges from −127 to 127 and can be expressed by 8 bits. In the method disclosed in Japanese Patent Laid-Open No. 05-075863, since the four lower bits (since sign extension is executed, the range is from −15 to 15) of the binarization error are added to the input pixel data, the binarization error ranges from −142 to 142. That is, 9 bits are necessary.

SUMMARY OF THE INVENTION

The present invention provides an image processing method and apparatus capable of decreasing the capacity requirements for a buffer memory while compensating for the impact of an arithmetic error at the time of error diffusion.

According to an aspect of the present invention, input image data is quantized, a quantization error generated by quantization is calculated, and the calculated quantization error is stored in a buffer. The quantization error is diffused on the basis of at least a quantization error of a first pixel, which is stored in the buffer, and the calculated quantization error of a second pixel. In addition, a component that reduces the impact of arithmetic error in error diffusion on subsequent input image data is provided.

As described above, according to the present invention, since the quantization error is stored in the buffer memory, the buffer memory only needs to have at least a capacity corresponding to the number of bits of the quantization error. Hence, the size of the buffer memory capacity can be reduced. In addition, with inclusion of the reduction component is arranged the influence of arithmetic error can be eliminated. Hence, the image quality of a highlight portion of an image in particular can be increased.

The apparatus may further comprise a stop component that stops propagating a correction value in a case in which it is inappropriate to propagate the correction value to the next and all subsequent pixels. A case in which it is inappropriate to propagate the correction value to the next and all subsequent pixels is, e.g., a case in which the pixel of interest is the start pixel of a line, a case in which the pixel of interest has a value equal to the lower limit level of the input image (e.g., a white pixel), or a case which the pixel of interest has a value equal to the upper limit level of the input image (e.g., a black pixel). The present invention can also be applied to any other inappropriate case other than the above cases, as a matter of course. It should be noted that the lower limit level or upper limit level need not always indicate a single value but may include a plurality of values present in a predetermined range.

The apparatus may further comprise a holding component that holds the decimal portion of the correction value, and a clear component that clears the decimal portion held in the holding component in a case in which it is inappropriate to connect the decimal portion of the correction value, which is held in the holding component, to the lower bit side of the next input image data.

The apparatus may further comprise a processing limit component that limits clearing by the clear component when a scanning direction of the input image is reversed.

For example, when the scanning direction is reversed every line, the clearing can be limited such that the decimal portion is cleared to 0 only at the start of the image. Hence, even when the scanning direction is reversed, the advantage of higher image quality can be expected.

The apparatus may further comprise a numerical value limit component that limits the quantization error calculated by the calculation component to a numerical value within a predetermined range. Accordingly, the size of the buffer memory that stores the quantization error can be reduced.

According to another aspect of the present invention, there is provided an image processing apparatus comprising a bit extension component that bit-extends image data of a pixel of interest, a correction component that corrects the bit-extended image data, a quantization component that quantizes an integral portion of the corrected image data, a holding component that holds a quantization error generated by the quantization component, a correction value generation component that generates a correction value to be used by the correction component on the basis of at least a first quantization error held in the holding component and a second quantization error related to the pixel of interest, and a storage component that stores a decimal portion of the correction value, which is to be connected to a lower bit side of next image data in bit extension processing by the bit extension component.

As described above, according to the present invention, since the quantization error is stored in the buffer memory, the buffer memory only needs to have at least a capacity corresponding to the number of bits of the quantization error, so the size of the buffer memory capacity can be reduced. In addition, since the input image data is corrected after the decimal portion after error diffusion calculation is connected to the lower bit side of the input image data, a higher image quality of the output image can be obtained.

According to still another aspect of the present invention, there is provided an image processing apparatus comprising a quantization component that quantizes a higher bit of input image data, a calculation component that calculates a quantization error generated by quantization by the quantization component, a buffer that stores the calculated quantization error, an error diffusion component that executes error diffusion of image data of a third pixel on the basis of at least a quantization error of a first pixel, which is stored in the buffer, and a quantization error of a second pixel, which is calculated by the calculation component, a holding component that holds a value not more than a predetermined bit of image data that has undergone error diffusion, an addition component that adds an integral portion of the held value to the input image data, and a bit connection component that connects a decimal portion of the held value to a lower bit side of the image data with the integral portion added and outputs the image data to the quantization component.

In this way, when the higher bits of the quantization error are stored in the buffer memory, the size of the buffer memory can be decreased. In addition, the lower bits of the integral portion of the image data with the correction value added by the error diffusion component are added to the next input image. The integral portion of the correction value from the error diffusion component is connected to the lower bit side of the input image data. Then, the input image data is corrected. With this arrangement, the impact of arithmetic error can be eliminated.

The calculation component may comprise a numerical value limit component that limits the calculated quantization error to a predetermined range and outputs the quantization error to the buffer. With this arrangement, the size of the buffer memory can be further decreased.

The maximum value of a quantization representative value to be used in calculating the quantization error may be set to a value not less than a maximum value of the input image data. In this case, any processing failure caused when the quantization error is accumulated without being corrected can be prevented.

The step width of the quantization representative value to be used in calculating the quantization error may be set to a constant value corresponding to a power of 2. For example, when all the quantization representative values have multiples of 16, just three bits of the output from the inverse quantizer suffice and the arrangement of the calculation component can therefore be simplified.

The apparatus may further comprise a first detection component that detects a pixel having a lower limit level value of the input image, and a first code output component that, when the pixel having the lower limit level value of the input image is detected, outputs an output code that minimizes the quantization representative value as an output code related to the pixel.

The apparatus may further comprise a second detection component that detects a pixel having an upper limit level value of the input image, and a second code output component that, when the pixel having the upper limit level value of the input image is detected, outputs an output code that maximizes the quantization representative value as an output code related to the pixel.

The apparatus may further comprise a replacement component that, when a pixel having either a lower limit level value or an upper limit level value is detected, replaces the quantization error related to the pixel with 0.

With this arrangement, since any unnecessary error propagation can be suppressed, the edge followability can be improved, and omission of thin lines and smear at highlight portions can be prevented.

According to still another aspect of the present invention, there are also provided an image processing method and image processing program corresponding to the above-described image processing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing the arrangement of an image processing apparatus according to a first embodiment;

FIG. 2 is a diagram showing illustrative positions and diffusion coefficients of a quantization error to be used for calculation of a diffusion filter 9;

FIG. 5 is a diagram showing illustrative positions and diffusion coefficients of a quantization error to be used for calculation of a diffusion filter 19 when the quantization error of an immediately preceding pixel is 0;

FIG. 6 is a block diagram showing the arrangement of an m-valued processing section using an m-valued processing method according to a fourth embodiment of the present invention;

DETAILED DESCRIPTION OF THE PREFERRED EMBODIMENTS

Figure 3:
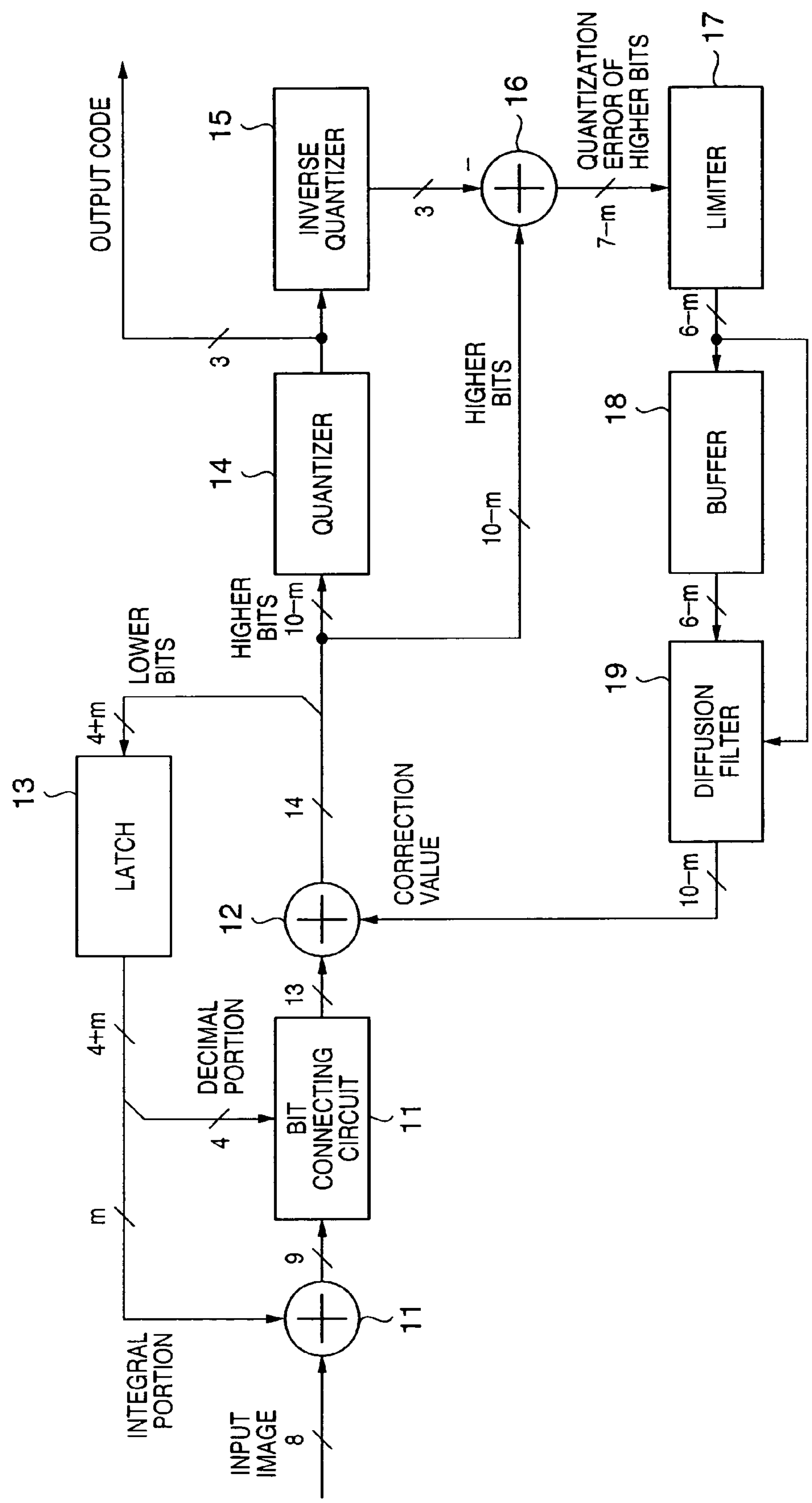
FIG. 3 is a block diagram showing the arrangement of an image processing apparatus according to a second embodiment.

Preferred embodiments of the present invention will now be described in detail in accordance with the accompanying drawings.

Embodiments of the present invention are described below. The following embodiments are disclosed for the convenience of practice by those skilled in the art in the technical field of the invention and are merely incorporated in the technical scope of the invention that is specified by claims. Those skilled in the art can therefore easily understand that even embodiments that are not directly described in this specification can also incorporated in the technical scope of this invention to the extent that they share the same technical concept.

A plurality of embodiments is described below for ease of explanation. Those skilled in the art can easily understand that the invention is constituted not only by each of these embodiments but also by appropriate combinations thereof.

First Embodiment

An embodiment of the present invention is described below in detail with reference to the accompanying drawings. FIG. 1 is a block diagram for explaining the arrangement of an image processing apparatus according to a first embodiment of the present invention.

Referring to FIG. 1, a bit connecting circuit 1 connects the cumulative value of decimals from a latch 3 to the lower bits of input image data. An adder 2 adds a correction value from a diffusion filter 9 to the input image data. The latch 3 delays the decimal portion of the adder 2 by one pixel. A quantizer 4 compares the integral portion of the adder 2 with a threshold value and converts the integral portion into an output code. An inverse quantizer 5 generates a quantization representative value from the output code. A subtracter 6 subtracts the quantization representative value from the value immediately before quantization to generate a quantization error. A limiter 7 limits the quantization error from the subtracter 6 to a predetermined range (existence range). A line buffer 8 delays the quantization error from the limiter 7 by about one line. The diffusion filter 9 multiplies coefficients corresponding to the quantization errors of the current pixel and the pixel to be diffused in the preceding line from the line buffer 8 and adds the sum to the next input image data in the adder 2.

The flow of processing will be described next. Detailed numerical values when the present invention is applied to 5-valued error diffusion is described below. In this embodiment, to decrease the capacity of the line buffer 8, not a value after error diffusion (the output value from the diffusion filter) but a quantization error itself is stored in the line buffer. Since the value (e.g., 6 bits) of a quantization error is smaller than a value (e.g., 10 bits) after error diffusion, the buffer capacity can be decreased.

FIG. 2 shows examples of diffusion coefficients to be used for calculation of the diffusion filter 9. As shown in FIG. 2, in the method (mean error minimizing method) of obtaining a correction value for the next pixel from neighboring quantization errors, the diffusion coefficients and positions of the error diffusion method have a point-symmetrical relationship.

FIG. 1 shows 8-bit input image data and, for each signal line, the number of bits when 5-valued error diffusion is executed using the diffusion coefficients shown in FIG. 2. The denominator of the diffusion coefficients shown in FIG. 2 is 16. Hence, the sum of the correction value from the diffusion filter 9 and the output image data from the bit connecting circuit 1 is 4 bits (decimal portion)+10 bits (integral portion) (−31 to 286)=a total of 14 bits. The decimal portion of corrected image data which is output from the adder 2 is delayed by one pixel by the latch 3 and input to the adder 2 together with the next pixel. Since the decimal portion by the diffusion coefficient is propagated to the next and subsequent pixels without being dropped, the quantization error is corrected (the entire quantization error is propagated).

On the other hand, the integral portion of the corrected image data is compared with a predetermined threshold value by the quantizer 4 and converted into a 5-valued code. Letting x be the input image data, an output code c and quantization representative value r are obtained in the following way.

When $x<32$, $c=0$, and $r=0$

When $32 \leqq x<96$, $c=1$, and $r=64$

When $96 \leqq x<160$, $c=2$, and $r=128$

When $160 \leqq x<224$, $c=3$, and $r=192$

When $224 \leqq x$, $c=4$, and $r=255$

Hence, when the threshold value of the quantizer is set at the median of each quantization representative value, the quantization error ranges from −31 to 31. On the other hand, since the correction value by the quantization errors of the neighboring pixels is added to the input image data, the output from the adder 2 falls outside the range of −31 to 31, though this occurs when the corrected image data exceeds the existence range of the input image data. Hence, the numerical value of the calculated quantization error can be limited to a predetermined range by the limiter 7 without any problem.

Since the quantization error is limited by the limiter 7, the line buffer 8 only needs to store a quantization error within the range of −31 to 31. Hence, the line buffer 8 requires only 6 bits. The size can be decreased by 4 bits because the output from the diffusion filter 9 has 10 bits.

The diffusion filter 9 multiplies the quantization error of the current pixel and that of the immediately preceding line, which is r ad out from the line buffer 8, by a diffusion coefficient shown in FIG. 2 to obtain a correction value, and outputs it to the adder 2.

With the above processing, 5-valued processing for one input image data is completed. If the processing is not ended for all pixels, the above processing is repeated while shifting the pixel position one by one until the processing is ended. With this repetitive processing, 5-valued processing for the entire image is completed.

In normal raster scan, the latch 3 is cleared to 0 at the start of a line. More specifically, the final line of a preceding line and the start pixel of the current line are not physically adjacent to each other and have a low image data correlation. However, since the pixels are adjacent pixels in the processing, the latch 3 is cleared to 0 at the start of a line to suppress unnecessary error propagation. In a scan scheme for inverting the scanning direction every line, two pixels continue both physically and in the processing even when the scanning direction is reversed (when the processing shifts from the preceding line to the current line). Hence, the error need not be cleared to 0 at the start of a line. It is rather preferable for the image quality to propagate the error. For this reason, if the scanning direction is to be reversed, zero clear at the start of a line is inhibited. Instead, zero clear is executed only at the start of the image or at the start of a line when the scanning direction is not inverted.

As described above, according to the first embodiment of the present invention, since the quantization error is limited to a predetermined range and stored in the buffer, the buffer capacity can be decreased. In addition, when the decimal portion at the error diffusion calculation is bit-connected to the lower bits of the image data, any rounding error in the error diffusion calculation can be corrected. As a result, the image quality and, more specifically, the image quality of a highlight portion with a small quantization error can be increased. Furthermore, the larger the number of levels after error diffusion becomes, the larger the buffer decreasing effect should become.

Second Embodiment

FIG. 3 is a block diagram showing the arrangement of an image processing apparatus according to the second embodiment of the present invention. Referring to FIG. 3, reference numerals 11 and 12 denote adders; 13, a latch; 14, a quantizer; 15, an inverse quantizer; 16, a subtracter; 17, a limiter; 18, a line buffer; and 19, a diffusion filter. Only parts different from the first embodiment is described below.

In this embodiment, the number of bits of the latch 13 is extended by m bits, and not only the decimal portion but also m lower bits of the integral portion after error correction are cumulatively added, thereby decreasing the capacity of the line buffer 18.

Hence, as in the first embodiment, the decimal portion of the output from the latch 13 is connected to the lower bits of input image data. On the other hand, the m-bit integral portion is added to the input image by the adder 11. For this reason, the output after bit connection has 13 bits. The separated integral portion having (10-m) bits is converted into an output code by the quantizer 14. The inverse quantizer 15 generates a quantization representative value. The subtracter 16 generates a quantization error. The quantization error is limited to a significant value by the limiter 17 and delayed by about one line by the line buffer 18, as in the first embodiment. The quantization error of the current pixel and that of the preceding line adjacent to the current pixel are input to the diffusion filter 19. The sum of products of diffusion coefficients corresponding to the quantization errors is obtained to calculate the correction value for the next pixel. The calculated correction value is added to the next pixel by the adder 12.

Assume m=2 for the descriptive convenience. In this case, the latch 13 has 6 bits, and the output range of the adder 11 is 0 to 258. An input x to the quantizer 14 has 8 bits (−7 to 72). An output code c and quantization representative value r (the actual weight is obtained by 2-bit left shift, i.e., the weight has a four-fold value) are obtained in the following way.

When $x<8$, $c=0$, and $r=0$

When $8 \leqq x<24$, $c=1$, and $r=16$

When $24 \leqq x<40$, $c=2$, and $r=32$

When $40 \leqq x<56$, $c=3$, and $r=48$

When $56 \leqq x$, $c=4$, and $r=64$

The reason why r=64 when 56≦x is as follows. If r=63, actual input value conversion (2-bit left shift) produces 63×4=252 which falls outside the input image range. As a consequence, when 255 data are continuously input, 255−252=3 quantization errors are accumulated without being corrected. This may exceed the output range of the adder 12, and the processing may fail. To suppress such processing failure, it is necessary to set the maximum value of the quantization representative value to a value equal to or larger than the maximum value of the input image data.

With this operation, the density of the black solid portion decreases slightly (by 1/256 level). However, this rarely influences because the change in density near the black solid portion is inherently small. Hence, a significant quantization error range is −8 to 7. The capacity of the line buffer 18 is decreased to 4 bits.

In this embodiment, the quantization representative values have multiples of 16 because a power of 2 is used as the step width. As a result, the output from the inverse quantizer 15 needs to have only 3 bits, and the inverse quantizer 15 and subtracter 16 are simplified.

In this embodiment, if the quantization error is small, the error distribution to the next pixel becomes relatively large, like when the input pixel data has a value close to the quantization representative value. Especially, when the quantization error is 3 or less, all of the error is distributed to the next pixel. This advances dot generation at a portion such as a highlight portion having a small quantization error. Hence, a delay of dot generation called "false edge" in error diffusion at a portion which has a large density change can be improved.

On the other hand, when input data has a value much different from the quantization representative value, the quantization error is large. For this reason, the error distribution ratio is almost the same as in the conventional method, and the dot distribution is held (a texture formed by dot connection is almost the same as in the conventional method).

Even when input data has a value near the quantization representative value, the quantization error becomes large when an neighboring quantization representative value (much different from the input data) is selected because of accumulation of errors. Hence, the error distribution ratio is almost the same as in the conventional method. If m is not so large, the dot distribution is held (a texture formed by dot connection is almost the same as in the conventional method).

If the texture by dot connection is too noticeable because m is large, the image quality can be increased by changing the diffusion coefficients. More specifically, when the quantization error of the immediately preceding pixel is 0, the diffusion coefficient of the pixel immediately under the current pixel is made large, as shown in FIG. 5. Accordingly, the ratio of the quantization error propagated to the lower side is compensated for to improve the dot distribution in the vertical direction. The diffusion coefficient is changed only when the quantization error is 0 because the effective distribution ratio is especially uneven when the quantization error is 0 (a variation in distribution ratio except when the effective error is 0 is relatively small). The effective distribution ratio also depends on the input data. Hence, the same effect as described above can also be obtained by changing the diffusion coefficients in accordance with the level of the input data.

Third Embodiment

Figure 4:
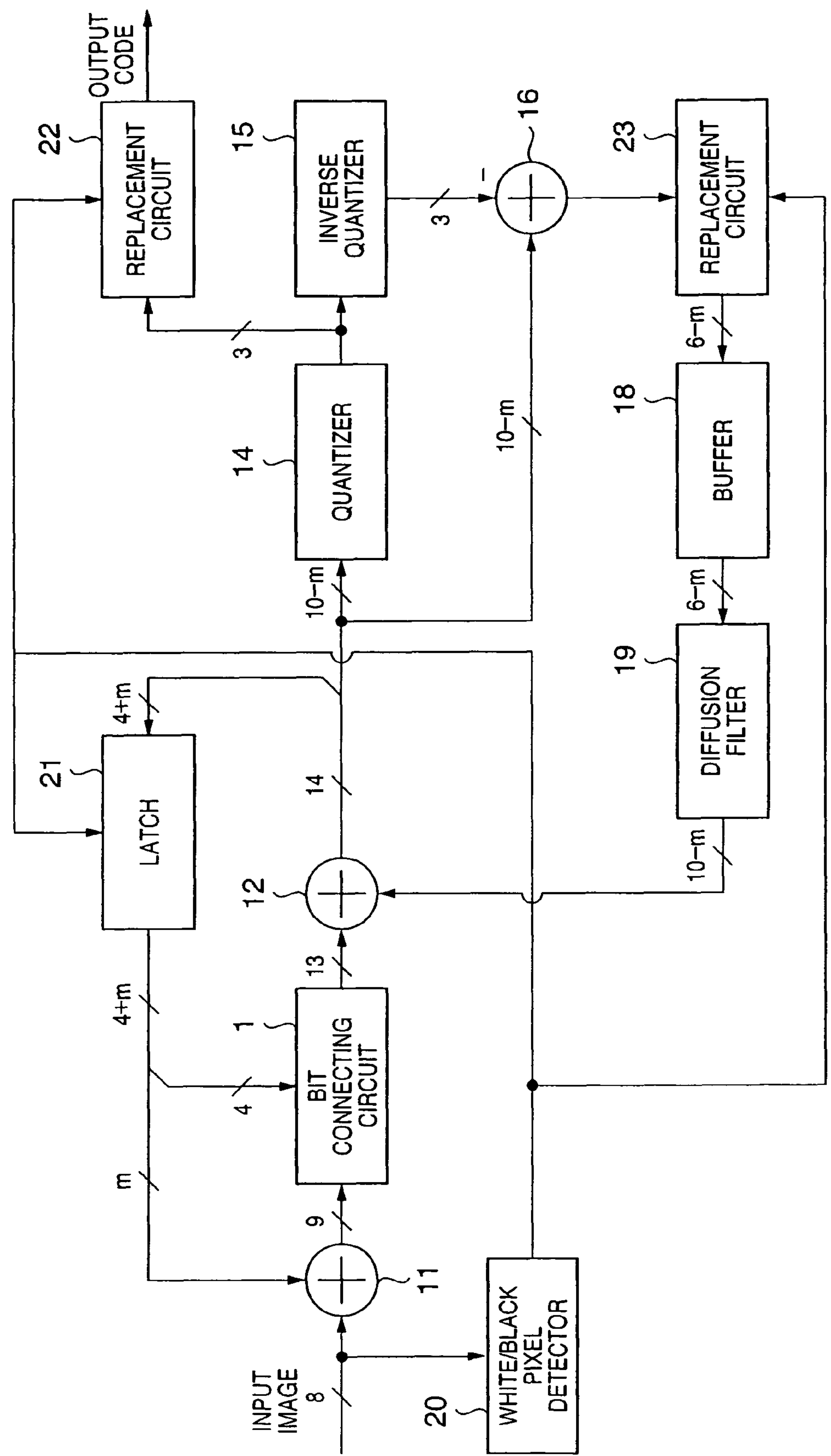
FIG. 4 is a block diagram showing the arrangement of an image processing apparatus according to a third embodiment.

FIG. 4 is a block diagram for explaining the arrangement of an image processing apparatus according to the third embodiment of the present invention. Referring to FIG. 4, reference numeral 20 denotes a white/black pixel detector; 21, a latch; 22, a code replacement circuit; and 23, a quantization error replacement circuit. Only parts different from the second embodiment is described below.

The white/black pixel detector 20 detects white pixels (0 in the second embodiment) and black pixels (255 in the second embodiment) of input image data. The detection result is output to the latch 21 and replacement circuits 22 and 23.

When the white/black pixel detector 20 detects a white or black pixel, the latch 21 clears the latch to prevent error propagation to the next and subsequent pixels. Accordingly, any inappropriate result such as smear at a highlight portion or omission of a thin line due to unnecessary error propagation can be suppressed.

When a white pixel is detected, the code replacement circuit 22 outputs a code (0 in the second embodiment) that represents a white pixel. When a black pixel is detected, the code replacement circuit 22 outputs a code (4 in the second embodiment) that represents a black pixel. For other pixels, the code replacement circuit 22 outputs the input code.

When a white or black pixel is detected, the quantization error replacement circuit 23 outputs "0". Otherwise, the quantization error replacement circuit 23 outputs a quantization error limited to a significant value, as in the above-described embodiments.

The effect can be obtained by preparing at least one of the clearing of the latch 21, the code replacement circuit 22, and the quantization error replacement circuit 23. However, a combination of two of them may be employed. Alternatively, all of the three components may be employed. The larger the number of components employed becomes, the higher the expected effect becomes.

In this embodiment, the upper and lower limit values of input image data are detected. When the upper or lower limit value of the input image data is detected, the image processing apparatus is set to 0 to prevent error propagation to the next and subsequent pixels. With this arrangement, any disadvantageous result such as a decrease in density of a black solid portion, omission of a thin line due to the diffusion error, or dot generation at a white pixel portion as described in the second embodiment can be suppressed.

In this embodiment, white and black pixels are detected. Those skilled in the art can understand that this is an extreme example. The present invention is not limited to this. For example, instead of detecting white and black pixels, pixels of a predetermined level or less or pixels of a predetermined level or more may be detected, and the above processing may be executed. The predetermined level means a so-called threshold value. This threshold value can be appropriately defined on the basis of tradeoff to a degradation in image. For example, a pixel having a level that can almost be regarded as a white pixel can be substantially used as a white pixel in accordance with the threshold value (however, if the threshold value is large, salt noise or pepper noise becomes conspicuous, so the threshold value is normally preferably set to the maximum or minimum value of input image data).

Fourth Embodiment

In a binarization method using a conventional error diffusion method, generally, stripes called "texture" or "worm" unique to the error diffusion processing is generated in a reproduced image, resulting in an adverse effect on the visual impression.

In addition, at a portion having a large density change, salt noise (a change portion from a high density to a low density) or pepper noise (a change portion from a low density to a high density) called "false edge" due to a delay of dot generation may be generated in a reproduced image and damage the reproducibility of the density.

Furthermore, when the error diffusion method is extended to multilevel processing for two or more values, dots disappear near the quantization representative value, and a pseudo contour may be recognized.

Japanese Patent Laid-Open No. 11-146201 proposes a method of solving these problems, in which pixel data having a uniform density and a predetermined width is detected from an input image and superposed with noise generated using a random number, thereby preventing generation of a texture pattern.

Japanese Patent Laid-Open No. 9-179974 proposes another method, in which a random number whose maximum value is changed in accordance with the input value of image information is generated at a period of 2 pixels or more. A signal with an inverted sign and the input value of the image information are added within the period of two pixels or more, and the sum signal value is converted into n-value data, thereby preventing generation of the "texture" or "worm".

In the prior works, however, since noise is superposed on the input image, the influence of superposed noise remains in the output image.

To prevent noise from affecting on the output image, the DC component of noise to be superposed must be "0". Such noise can hardly suppress generation of "false edge" or "texture". To decrease the granularity of the output image, the low-frequency component of noise must be suppressed, and the periodicity must be broken. It is however difficult to generate noise that meets these requirements.

Additionally, if noise having a large amplitude is superposed to eliminate "texture" or "worm", the noise remains on the output image, resulting in highly granular image with a poor quality. It is therefore also difficult to add noise having an optimum amplitude.

The invention of the fourth embodiment has as its object to provide an image processing method that suppresses any factors such as "texture", "worm", and "false edge" that are generated by error diffusion and degrade the image quality, and minimizes the influence of noise to be superposed on the image.

FIG. 6 is a block diagram showing the arrangement of an m-valued processing section using an m-valued processing method according to the fourth embodiment of the present invention. In the arrangement shown in FIG. 6, 5-valued error diffusion (i.e., m=5) is executed for a multilevel image data having 8-bit pixels using diffusion coefficients to be described later. Four threshold values to be used for 5-value processing of the 8-bit multilevel image data are "32", "96", "160", and "224".

Referring to FIG. 6, an adder 61 adds a correction value (e) from a diffusion filter 60 to input image data (x). A noise generation circuit 62 generates the absolute value of noise having 5 bits per pixel, which is to be superposed on the image data with the correction value added. A comparator 63 compares the input image data with a threshold value for quantization and inputs the result to a negative sign adding circuit 64 as a 1-bit signal (s).

In the negative sign adding circuit 64, in accordance with the comparison result from the comparator 63, if the input image data is larger than the threshold value of a quantizer 66, the output from the noise generation circuit 62 is converted into a negative value (more specifically, the output is bit-inverted, and 1 is added to the value) and input to an adder 65. Hence, a signal (n) output from the negative sign adding circuit 64 is a 6-bit signal. On the other hand, when the input image data is smaller than the threshold value of the quantizer 66, the output from the noise generation circuit 62 is directly input to the adder 65.

The adder 65 adds the noise with the sign to the image data with the correction value added, and inputs the sum (x+e+n) to the quantizer 66. The quantizer 66 compares the corrected input image data to which the noise is added with the threshold value and converts the data into a 3-bit code. The code is output and also input to an inverse quantizer 67. The inverse quantizer 67 generates a quantization representative value from the code and inputs a result (r) to a subtracter 68. The subtracter 68 subtracts the quantization representative value from the value before noise addition before quantization to generate a 7-bit quantization error. The quantization error is stored in an error buffer 69.

The error buffer 69 delays the quantization error by about one line and outputs an error value of a pixel necessary for calculation of the diffusion filter 60. The diffusion filter 60 multiplies the quantization error of the pixel of interest and that of a pixel to be diffused in the preceding line, which are read out from the error buffer 69, by corresponding coefficients, and outputs the sum to the adder 61. This output is added to the next input image data as a correction value.

The operation of the m-valued processing section in the above arrangement will be described next in detail. In this embodiment, to decrease the capacity of the error buffer 69, not a value after error diffusion (the value from the diffusion filter) but a quantization error itself is stored in the error buffer.

In this embodiment, the diffusion filter 60 executes calculation using the diffusion coefficients shown in FIG. 2 or 5. As shown in FIG. 2, in the method (mean error minimizing method) of obtaining the correction value for the next pixel from neighboring quantization errors, the diffusion coefficients and positions of the error diffusion method have a point-symmetrical relationship.

The noise generation circuit 62 generates a value smaller than the difference between the quantization representative value and the threshold value of the quantizer 66, i.e., a value from 0 to 31 at random.

The comparator 63 compares the input image data with the threshold value of the quantizer 66 and the quantization representative value of the inverse quantizer 67 and determines the sign of noise. In this case, the input image data (x) and the signal (s) representing the sign of noise have the following relationship.

When $x<32$, $s=0$

When $32\leqq x<64$, $s=1$

When $64\leqq x<96$, $s=0$

When $96\leqq x<128$, $s=1$

When $128\leqq x<160$, $s=0$

When $160\leqq x<192$, $s=1$

When $192\leqq x<224$, $s=0$

When $224\leqq x$, $s=1$

That is, as the signal (s) representing the sign of noise, the information of the sixth bit is extracted from the LSB of the input image data (x).

The quantizer 66 converts input data (x+e+n) expressed by 10 bits into the 5-valued code (c). More specifically, when the above threshold values are taken into consideration for the corrected input image data (x+e), the 3-bit output codes (c) are as follows.

When $x+e<32$, $c=0$

When $32\leqq x+e<96$, $c=1$

When $96\leqq x+e<160$, $c=2$

When $160 \leqq x+e<224$, $c=3$

When $224 \leqq x+e$, $c=4$

To simplify the arrangement of the quantizer 66, the negative sign adding circuit 64 causes the adder 65 to add the noise (n) to which an offset of 31 is added at maximum to the corrected input image data (x+e). More specifically, for the corrected input image data (x+e+n) after noise addition, the output code (c) is as follows.

When $x+e+n<64$, $c=0$

When $64 \leqq x+e+n<128$, $c=1$

When $128 \leqq x+e+n<192$, $c=2$

When $192 \leqq x+e+n<256$, $c=3$

When $256 \leqq x+e+n$, $c=4$

That is, as the output code (c), the three higher bits excluding the sign bit of the 10-bit corrected input image data after noise addition are extracted. However, as will be described later, the output code (c) may sometimes take a value outside the range depending on the value of the correction value (e), and more specifically, when (x+e+n)<0 and (x+e+n)>319.

When (x+e+n)<0, the value obtained by extracting the three higher bits excluding the sign bit is "7", and therefore, c=7. However, the desired output code (c) is "0". If the value of the output code is "7", it is converted into "0" and then output. Since the range of the quantization error is ±63, c=6 does not hold. If both of the values of two higher bits are "1", c=0 (i.e., all the three bits are "0") may be set.

On the other hand, when (x+e+n)>319, the value obtained by extracting the three higher bits excluding the sign bit is "5", and therefore, c=5. However, the desired output code (c) is "4". If c=5, it is converted into c=4 and then output (i.e., if the two higher bits are "1" and non, respectively, from the higher side, the LSB is set to "0").

The inverse quantizer 67 converts the output code (c) for the quantizer 66 into the quantization representative value (r) expressed by 8 bits. More specifically, the quantization representative value (r) is as follows.

When c=0, r=0

When c=1, r=64

When c=2, r=128

When c=3, r=192

When c=4, r=255

Except when c=4 (i.e., when the MSB of the 3-bit output code becomes "0"), six "0"s are connected to the two lower bits excluding the MSB to obtain an 8-bit value as a quantization representative value. When c=4 (i.e., when the MSB of the 3-bit output code becomes "1"), a value in which all the 8 bits are "1" is used as the quantization representative value.

The negative sign adding circuit 64 adds the sign and offset to the noise generated by the noise generation circuit 62.

More specifically, let (rnd) be the output from the noise generation circuit 62, and (s) be the 1-bit signal output (the value of bit 5 (b5) of the input image data (x)) from the comparator 63. Then, the 6-bit output (n) from the negative sign adding circuit 64 is as follows.

When $s=0$, $n=rnd+32$

When $s=1$, $n=32-rnd$

The absolute value when s=0 need not always coincide with that when s=1. That is, when s=0, noise having a value of 32 to 63 is output, and when s=1, noise having a value of 0 to 31 it output. Hence, the output (s) from the comparator 63 is inverted and connected to the higher bits of the output (rnd) of the noise generation circuit 62. This noise only functions to attract the input image data to the threshold value side (i.e., causes the input image data to easily cross the threshold value). Hence, a code (quantization representative value) that cannot be selected is rarely selected.

For example, when the input image data (x) is "95", "1" or "2" is output as the output code (c) in accordance with the correction value (e), as is described below.

When x=95, b5=0, i.e., s=0. When noise is superposed, positive noise is superposed.

The absolute value of a negative quantization error is maximum when quantization representative value (r)=128, i.e., (x+e+n)=128 (with an offset of 32). As described above, when s=0, 32<n<63, and therefore, the minimum value of (x+e) is 128−63=65. Hence, the maximum value of the negative quantization error is 65−128=−63.

On the other hand, the absolute value of a positive quantization error is maximum when quantization representative value (r)=64, i.e., (x+e+n)=127 (with an offset of 32). As described above, when s=0, 32≦n≦63, and therefore, the minimum value of (x+e) is 127−32=95. Hence, the maximum value of the positive quantization error is 95−64=31.

The range of the correction value (e) is narrower than the above quantization error range because the neighboring quantization errors are filtered by the diffusion filter 60. Even when this range is added to the input image as a correction value, 64≦x+e+n≦158<192, and therefore, the output code (c) is 1 or 2.

The quantization error range in the quantizer 66 is extended to ±63 ((distance between quantization representative values)−1) by superposition of noise. Hence, 7 bits are required as the output bits of the subtracter 68.

Since the denominator of the diffusion coefficients shown in FIG. 2 is 16, to express the correction value in the diffusion filter 60, an integral portion of 7 bits and a decimal portion of 4 bits, i.e., a total of 11 bits are necessary. The 7-bit integral portion is added to the input image data.

The noise generation circuit 62 of this embodiment is a circuit which generates a random number in the above range. For example, an M-sequence pseudo random code generation circuit using an LFSR (Linear Feedback Shift Register) is used.

Figure 7:
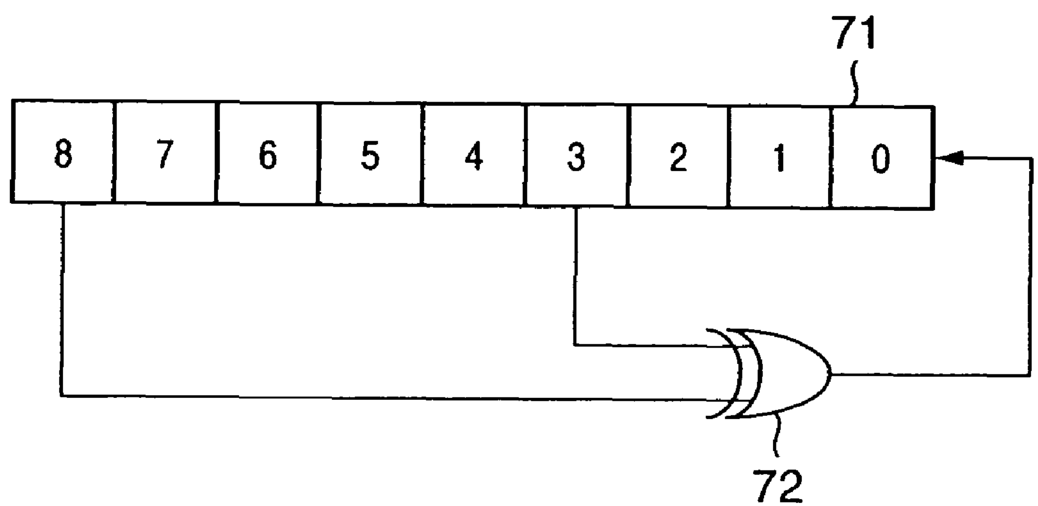
FIG. 7 is a diagram showing the arrangement of a noise generation circuit 62.

FIG. 7 is a diagram showing the arrangement of a 9-bit M-sequence pseudo random code generation circuit. Referring to FIG. 7, reference numeral 71 denotes a shift register; and 72, an EXOR circuit.

In this M-sequence pseudo random code generation circuit, a value other than "0" is loaded to the shift register 71 first, the EXOR (EXclusive OR) of a bit corresponding to the primitive polynomial of the shift register 71 is calculated, input to the LSB (bit 0), and shifted to the left to obtain the following random number.

In this embodiment, since the number of stages of the shift register 71 is 9, a ninth-order primitive polynomial $X^9+X^4+1$ is used. Hence, the EXOR of the MSB (bit 8) and bit 3 of the shift register 71 is calculated by the EXOR circuit 72, input to the LSB (bit 0), and shifted to the left at the next clock. With this arrangement, a random number from 1 to 511 is generated at a period of 511. Since the noise generation range of the noise generation circuit 62 is 0 to 31, the noise generation circuit 62 that generates a value of 0 to 31 at the 511 period can be constructed by using five arbitrary bits of the shift register 71.

As described above, since the M-sequence pseudo random code generation circuit uses a shift register, continuous random numbers have a slight correlation. Hence, the peak of the noise power is present at a relatively low frequency. When this value is input to the input image as noise, the noise is readily observed in the output image. On the other hand, when noise is superposed in the feedback loop of error diffusion, as in this embodiment, the density is maintained by the feedback loop even when the noise contains a DC offset. In addition, as described above, even when the peak of the noise power is present at a relatively low frequency, the low-frequency component of the quantization error (noise) is modulated by the feedback loop of error diffusion to a high frequency that is hardly be visually detected. For this reason, the influence of noise on the output image considerably becomes small.

Hence, according to the above-described embodiment, since noise is added not to the input image but to the corrected input image, the density is maintained by the feedback loop of error diffusion regardless of the added noise. In addition, the low-frequency component of noise is modulated by the feedback loop of error diffusion to a high frequency that is hardly be visually detected. For this reason, the influence of noise on the output image can be suppressed.

Furthermore, since the absolute value of noise to be added to the input image data is limited to be smaller than the difference value (i.e., 32) between the threshold value of the quantizer and the quantization representative value, and the direction of noise addition is aligned to the direction of threshold value, the image data can cross the threshold value (the position of the output code can be shifted) at a minimum noise amplitude.

Even when noise is superposed, as the output code for a predetermined input value, continuous codes are rarely output except two continuous codes, and the code ratio does not change except the position of each output code is shifted. Hence, any disadvantages such as an increase in granularity due to noise superposition are generated, so factors such as "texture", "worm", and "false edge" that degrade the image quality can be eliminated.

Fifth Embodiment

Figure 8:
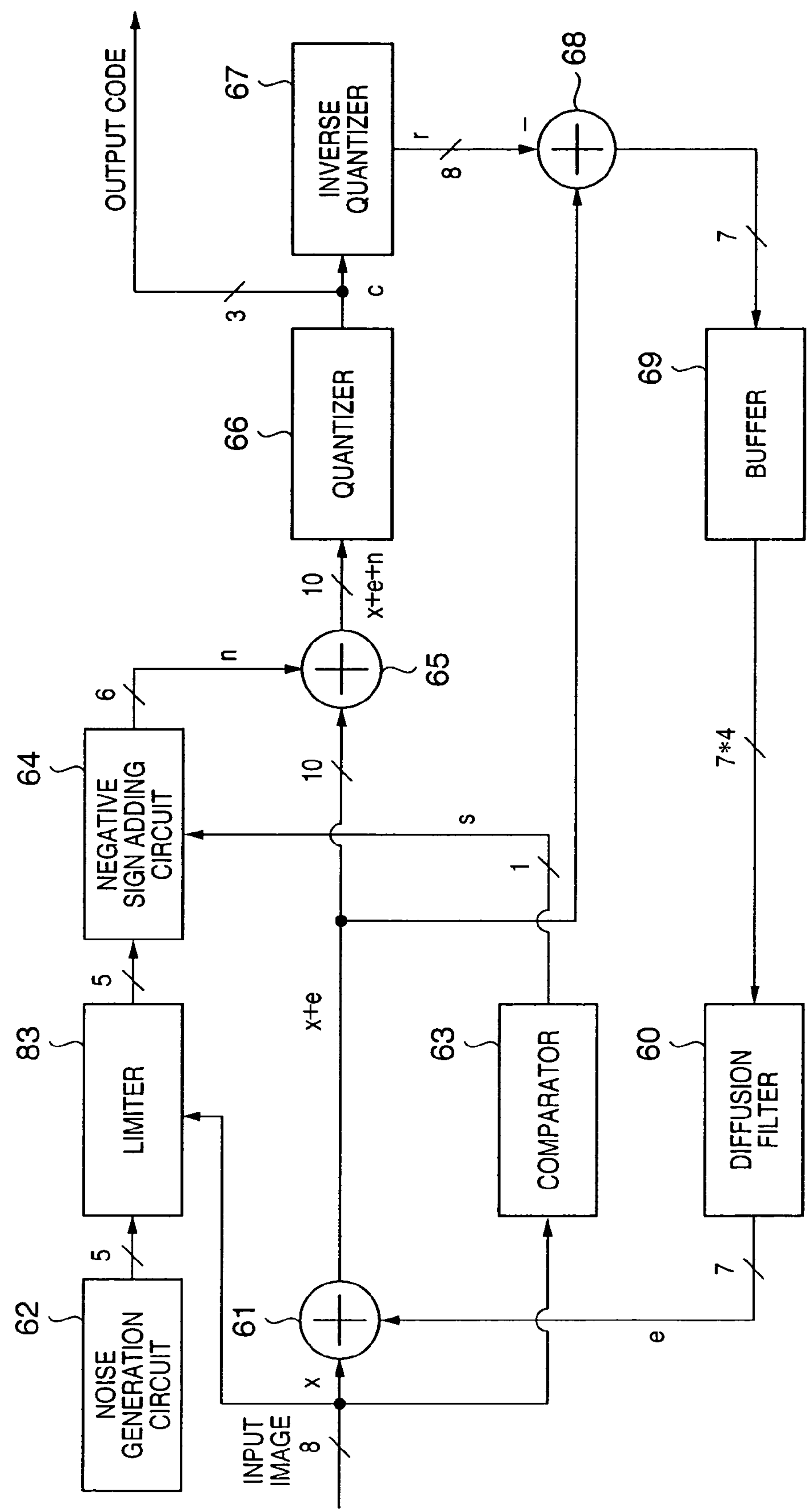
FIG. 8 is a block diagram showing the arrangement of an m-valued processing section using an m-valued processing method according to the second embodiment of the present invention.

FIG. 8 is a block diagram showing the arrangement of an m-valued processing section using an m-valued processing method according to the fifth embodiment of the present invention. Referring to FIG. 8, reference numeral 83 denotes a limiter. The difference from the fourth embodiment will be mainly described below.

In this embodiment, the limiter 83 is inserted between a noise generation circuit 62 and a negative sign adding circuit 64. The limiter 83 limits the output from the noise generation circuit 62 to a value corresponding to the difference between input image data and the threshold value of quantization and inputs the value to the negative sign adding circuit 64.

The operation will be described next in detail. As a characteristic feature of this embodiment, noise is superposed to execute correction to exceed the threshold value, thereby easily generating the code on the opposite side. For this reason, the difference value between input image data and the threshold value suffices as the maximum value of the noise generation circuit 62. Hence, when the limit value of the limiter is controlled on the basis of the difference between input image data and the threshold value, more optimum noise can be generated.

More specifically, when bit 5 (b5) of input image data is "1", i.e., s=1, a smaller one of a value represented by the value of the five lower bits (b4 to b0 (LSB)) of input image data (x) and a predetermined value is set as the limit value (LMT). When the output from the noise generation circuit 62 exceeds this limit, the limit value is output. On the other hand, when bit 5 (b5) of the input image data is "0", i.e., s=0, a smaller one of a value obtained by inverting the five lower bits (b4 to b0) of the input image data and a predetermined value is set as the limit value (LMT). When the output from the noise generation circuit 62 exceeds this limit, the limit value is output.

In this algorithm, when the value of the input image data (x) is near the threshold value, the limit value is a very small value close to "0". Since the noise to be superposed becomes small, the noise superposing effect is small. Hence, if the limit value is smaller than a set minimum value, the set minimum value is used as the limit value.

Assume that the maximum value generated by the noise generation circuit 62 is set near the difference between the threshold value of a quantizer 66 and a quantization representative value, i.e., the maximum value "31" is near the difference value "32", as in this embodiment. For a pixel with the maximum value superposed, a quantization representative value much different from a value represented by the input image data is selected by a very small correction value (e). For this reason, at an edge portion, codes different from the input image data may be arranged at an interval. Alternatively, when image formation is executed by scanning an inkjet printhead, codes that should not be generated may be generated for image input data which contains a slight gradation in the scanning direction of the printhead and has a value close to the quantization representative value (this is called overcompensation).

According to the fifth embodiment, however, since the maximum value of generated noise is limited to an appropriate value by the limiter 83, the quantization representative value becomes much different from the value of the input image data at a very low probability even when the correction value (e) is taken into consideration. Hence, generation of "texture", "worm", and "false edge" can be suppressed with less disadvantages, and any degradation in image quality can be prevented.

In this embodiment, the limit value is generated directly from the value of lower bits of input image data. However, a similar limit value may be determined by looking up a table using the lower bits of input image data.

Sixth Embodiment

Figure 9:
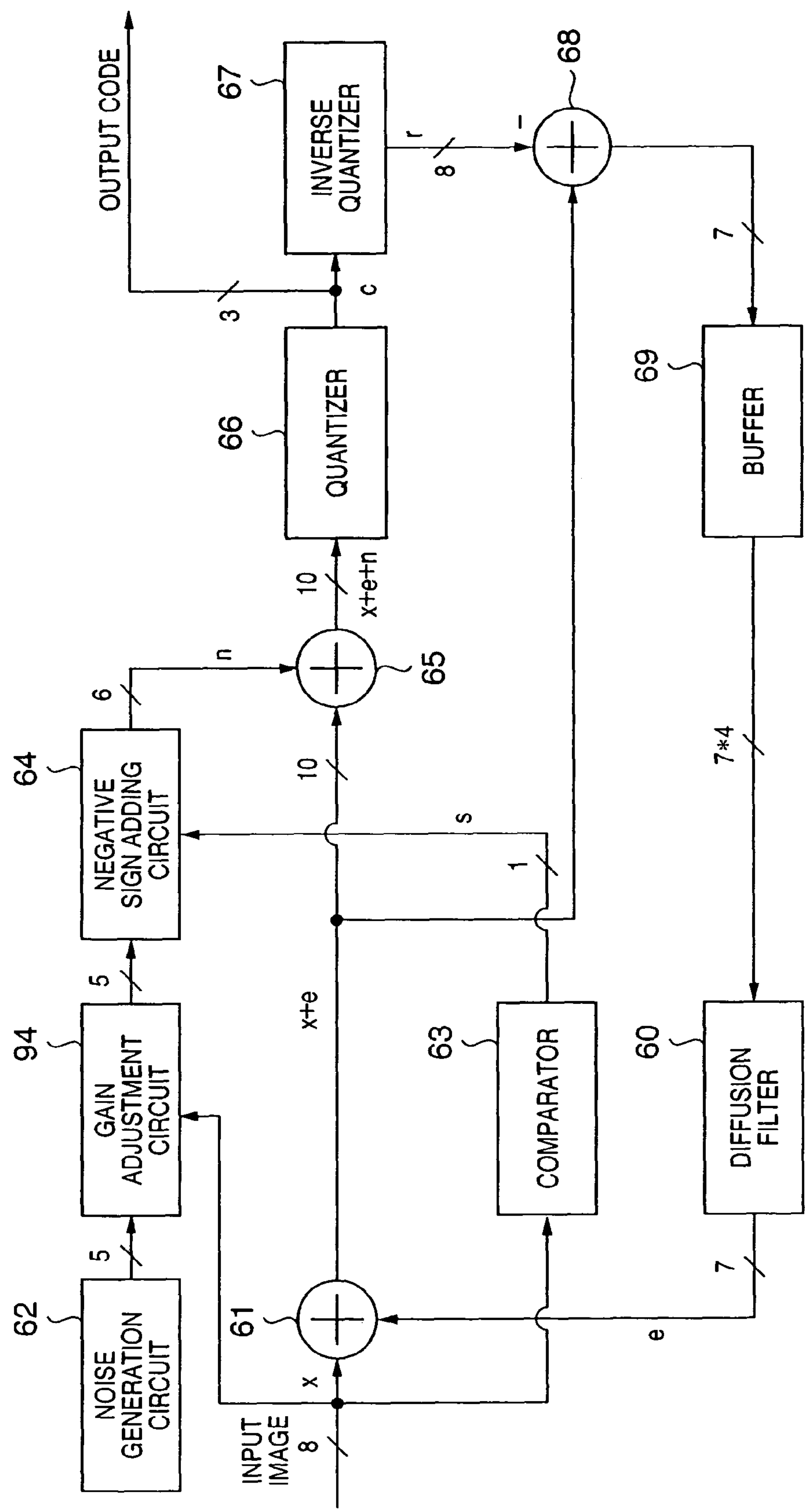
FIG. 9 is a block diagram showing the arrangement of an m-valued processing section using an m-valued processing method according to the third embodiment of the present invention.

FIG. 9 is a block diagram showing the arrangement of an m-valued processing section using an m-valued processing method according to the sixth embodiment of the present invention. Referring to FIG. 9, reference numeral 94 denotes a gain adjustment circuit. The difference from the first and second embodiments will be mainly described below.

In this embodiment, the gain adjustment circuit 94 is inserted between a noise generation circuit 62 and a negative sign adding circuit 64. To limit the output from the noise generation circuit 62 to a value corresponding to the difference between input image data and the threshold value of quantization, the gain adjustment circuit 94 inputs to the negative sign adding circuit 64 a value obtained by multiplying the output from the noise generation circuit 62 by a predetermined value.

The operation will be described next in detail. As described in the fifth embodiment, the difference value between input image data and the threshold value suffices as the maximum value of the noise generation circuit 62. Hence, more optimum noise is generated by controlling the gain of the gain adjustment circuit 94 in accordance with the difference between input image data and the threshold value.

More specifically, when bit 5 (b5) of input image data is "1", i.e., s=1, the output from the noise generation circuit 62 is multiplied by, as a gain, a smaller one of a value represented by the value of the five lower bits (b4 to b0 (LSB)) of input image data (x) and a predetermined value. The higher bits of a resultant signal are output to the negative sign adding circuit 64 as noise. On the other hand, when bit 5 (b5) of the input image data is "0", the output from the noise generation circuit 62 is multiplied by, as a gain, a smaller one of a value obtained by inverting the five lower bits (b4 to b0) of the input image data and a predetermined value. The higher bits of a resultant signal are output to the negative sign adding circuit 64 as noise.

As in the fifth embodiment, in this algorithm, when the value of the input image data (x) is near the threshold value, the limit value is a very small value close to "0". Since the noise to be superposed becomes small, the noise superposing effect is small. Hence, if the gain is smaller than a set minimum value, the set minimum value is used as the gain.

According to the above-described embodiment, when the gain of noise is adjusted, noise equal to or smaller than a predetermined value is generated at a uniform probability. Hence, as in the fifth embodiment, noise can be superposed with less disadvantages.

In this embodiment, the gain is generated directly from the value of lower bits of input image data. However, a similar gain may be determined by looking up a table using the lower bits of input image data.

Additionally, in the description of this embodiment, a multiplier is used as the gain adjustment circuit 94. However, the gain adjustment circuit 94 need not always be a multiplier, and any other device capable of adjusting the gain can be used. For example, even when a bit shift is used, or higher bits are masked, the same effect as described above can be obtained.

Especially, in an arrangement for masking bits of noise, when bit 5 (b5) of input image data is "1", i.e., s=1, the noise is ANDed by, as mask data, the five lower bits (b4 to b0 (LSB)) of input image data (x). On the other hand, when bit 5 (b5) of input image data is non, i.e., s=0, the noise is ANDed by, as a mask data, a value obtained by inverting the five lower bits (b4 to b0 (LSB)) of the input image data.

At this time, when the output of the lower bits is set to a fixed pattern (e.g., "011"), the set minimum value can easily be obtained.

Figure 10:
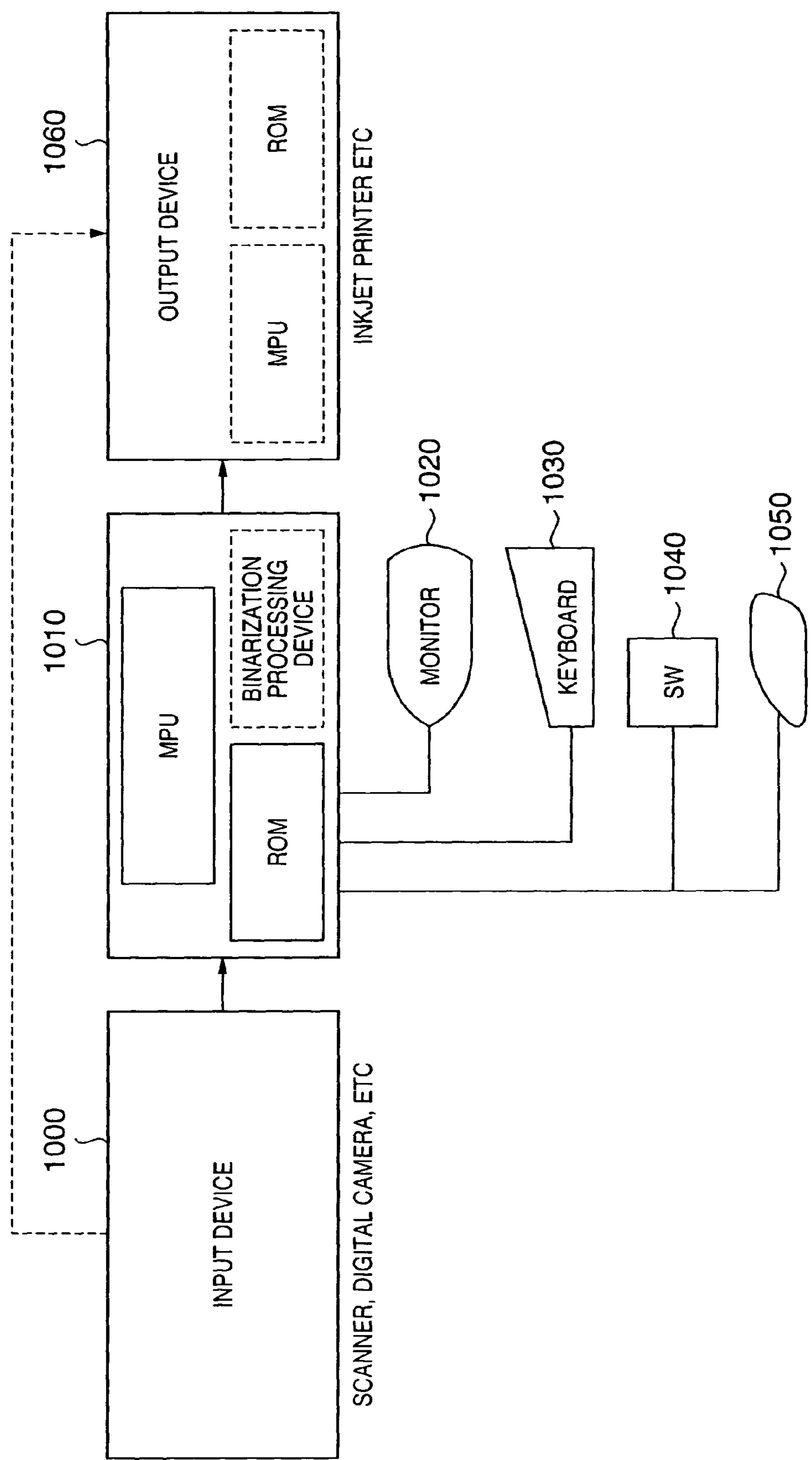
FIG. 10 is a block diagram showing the general arrangement of an image input/output system.

FIG. 10 is a block diagram showing the general arrangement of an image input/output system. An image input/output system to which the m-valued processing apparatus according to one of several embodiments described above is applied will be described here. In this case, 2≦m<n, and n is the number of levels representing image data of each color component of input multilevel image data. In the above-described embodiments, m=5.

Multilevel color image data read or generated by an input device 1000 such as a color scanner or digital camera is normally output to a monitor 1020 such as a CRT, PDP, or LCD through a personal computer 1010, so that the color image is displayed on the screen of the monitor.

The user corrects the layout or R, G, and B color components by operating a keyboard 1030, switch (SW) 1040, and pointing device 1050 connected to the personal computer 1010 while seeing the monitor screen.

For the thus corrected and edited color image data, luminance/density conversion is executed in accordance with the print mode and the type of printing medium (e.g., printing paper) to be used by an output device (e.g., an inkjet printer) 1060 to which the color image data should be output next. In this way, the RGB data is converted into multilevel density data containing C, c, M, m, Y and K color components.

The multilevel density data containing C, c, M, m, Y and K color components is input to the above-described m-valued processing section and undergoes m-valued processing to generate m-valued data of C, M, Y, and K color components. These data are transferred to the output device (e.g., the inkjet printer) 1060, and a color image is printed.

FIG. 10 shows an example in which the m-valued processing apparatus is incorporated in the personal computer 1010. Instead, the m-valued processing apparatus may be incorporated on the side of the output device 1060.

In the above-described embodiments, error diffusion processing is executed using a logic circuit. However, the present invention is not limited to this. For example, since the performance of a microprocessor (MPU) is increasing in recent years, error diffusion processing may be executed by causing the microprocessor to read out and execute a program stored in a ROM.

In this case, the microprocessor may be incorporated in the personal computer 1010. If a digital camera is directly connected to the output device (e.g., inkjet printer 1060) to output a color image, the microprocessor may be incorporated in the output device.

The object of the present invention can also be achieved by supplying a storage medium (or a recording medium) which stores software program codes for implementing the functions of the above-described embodiments to a system or apparatus and causing the computer (or a CPU or MPU) of the system or apparatus to read out and execute the program codes stored in the storage medium. In this case, the program codes read out from the storage medium implement the functions of the above-described embodiments by themselves, and the storage medium which stores the program codes constitutes the present invention. The functions of the above-described embodiments are implemented not only when the readout program codes are executed by the computer but also when the operating system (OS) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, according to the first aspect, the image processing apparatus is designed to store the quantization error in the buffer memory. Since the buffer memory only needs to have the number of bits of the quantization error, the size of the buffer memory can be decreased as compared to the prior arts. When the decimal portion after error diffusion calculation is connected to the lower bit side of input image data, and then, the input image data is corrected, the impact of an arithmetic error can be reduced. Especially, a highlight portion of the image is expected to have a high image quality.

According to the second aspect, the image processing apparatus is designed to store only the higher bits of the quantization error in the buffer memory. With this arrangement, the size of the buffer memory can be smaller than in the first aspect. When an arrangement for cumulatively adding values equal to or less than a predetermined bit of image data, which are obtained by adding a correction value output from an error diffusion filter, is employed, the impact of an arithmetic error can be reduced.

According to the third aspect, when a pixel of interest is a white pixel (the lower limit of the input image range) or black pixel (the upper limit of the input image range), since any unnecessary error propagation is suppressed, the edge followability can be improved, and omission of thin lines and smear at highlight portions can be prevented.

According to the fourth aspect, factors such as “texture”, “worm”, and “false edge” that are generated by error diffusion and degrade the image quality can be suppressed, and the influence of noise superposed on the image can be minimized. Hence, a high-quality image can be formed.

The present invention can be applied to a system constituted by a plurality of devices, or to an apparatus comprising single device. Furthermore, it goes without saying that the invention is applicable also to a case in which the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for quantizing input image data, the apparatus comprising:

a bit connection component that connects a decimal portion of corrected image data of a preceding pixel output from a latch component, to input image data of a target pixel as lower bits of the image data of the target pixel, and outputs the bit-connected image data of the target pixel, wherein the bit-connected image data has an integer portion of the image data of the target pixel and the decimal portion of image data of the preceding pixel;

a correction component that generates corrected image data of the target pixel by adding a correction value to the bit-connected image data of the target pixel;

the latch component that latches a decimal portion of the corrected image data generated by the correction component of the target pixel by splitting-off, prior to performing quantization of the corrected image data, the decimal portion of the corrected image data from an integer portion of the corrected image data, output by the correction component, the split-off and latched decimal portion to be connected to image data of a next pixel by the bit connection component, wherein the latch does not latch the integer portion of the corrected image data of the target pixel;

a quantization component that receives an integer portion of the corrected image data without receiving the decimal portion of the corrected image data of the target pixel, and quantizes the received integer portion of the corrected image data of the target pixel;

an inverse quantizing component that inverse-quantizes the quantized integer portion of the corrected image data of the target pixel, and outputs an inverse-quantized data of the target pixel;

a calculation component that outputs a quantization error of the target pixel based on a difference between the integer portion of the corrected image data of the target pixel and the inverse-quantized data of the target pixel;

a buffer that stores the integer portion of the calculated quantization error regarding each of the pixels, the integer portion of the calculated quantization error not including the decimal portion; and an error diffusion component that generates a correction value by diffusing the quantization error stored in said buffer, wherein the correction value to be added to the bit-connected image data of the target pixel in said correction component is generated by said error diffusion component based on the calculated quantization errors of neighboring pixels of the target pixel stored in said buffer and diffusion coefficients being smaller than 1.0.

2. The apparatus according to claim 1, further comprising a stop component that stops propagating the correction value in a case in which it is inappropriate to propagate the correction value to next and subsequent pixels.

3. The apparatus according to claim 1, further comprising:

a clear component that clears the decimal portion held in said latch component in a case in which it is inappropriate to connect the decimal portion of the correction value, which is latched in said latch component, to the lower bit side of the next input image data.

4. The apparatus according to claim 3, further comprising a processing limit component that limits clearing by said clear component when a scanning direction of the input image is reversed.

5. The apparatus according to claim 2, wherein the case in which it is inappropriate to propagate the correction value to next and subsequent pixels includes at least one of a case in which a pixel of interest is a start pixel of a line, a case in which the pixel of interest has a value equal to a lower limit level of the input image, and a case in which the pixel of interest has a value equal to an upper limit level of the input image.

6. The apparatus according to claim 1, further comprising a numerical value limit component that limits the quantization error calculated by said calculation component to a numerical value within a predetermined range.

7. A method for quantizing input image data implemented in an image processing apparatus comprising a processor and a memory, the method comprising:

the processor performing the steps of:

a bit connection step of connecting a decimal portion of corrected image data of a preceding pixel output from a latch component, to input image data of a target pixel as lower bits of the image data of the target pixel, and outputting the bit-connected image data of the target pixel, wherein the bit-connected image data has an integer portion of the image data of the target pixel and the decimal portion of image data of the preceding pixel;

a correction step of generating corrected image data of the target pixel by adding a correction value to the bit-connected image data of the target pixel;

a latch step of latching, by the latch component, a decimal portion of the corrected image data generated by the correction component of the target pixel by splitting-off, prior to performing quantization of the corrected image data, the decimal portion of the corrected image data from an integer portion of the corrected image data, output by the correction step, the split-off and latched decimal portion to be connected to the image data of the next pixel by the bit connection step, wherein the latch component does not latch the integer portion of the corrected image data of the target pixel;

a quantization step of receiving an integer portion of the corrected image data without receiving the decimal portion of the corrected image data of the target pixel, and quantizing the received integer portion of the corrected image data of the target pixel;

an inverse quantizing step of inverse-quantizing the quantized integer portion of the corrected image data of the target pixel, and outputting an inverse-quantized data of the target pixel;

a calculation step of outputting a quantization error of the target pixel based on a difference between the integer portion of the corrected image data of the target pixel and the inverse-quantized data of the target pixel;

a storing step of storing the integer portion of the calculated quantization error regarding each of the pixels, the integer portion of the calculated quantization error not including the decimal portion; and an error diffusion step of generating a correction value by diffusing the quantization error stored in said buffer, wherein the correction value to be added to the bit-connected image data of the target pixel in said correction step is generated by said error diffusion step based on the calculated quantization errors of neighboring pixels of the target pixel stored in said buffer and diffusion coefficients being smaller than 1.0.

8. The method according to claim 7, further comprising a step of stopping propagation of the correction value in a case in which it is inappropriate to propagate the correction value to next and subsequent pixels.

9. The method according to claim 7, further comprising the step of:

clearing the decimal portion held in said latching step in a case in which it is inappropriate to connect the decimal portion of the correction value, which is latched in said latch step, to the lower bit side of the next input image data.

10. The method according to claim 9, further comprising a step of limiting the clear process of said clear step when a scanning direction of the input image is reversed.

11. The method according to claim 8, wherein the case in which it is inappropriate to propagate the correction value to next and subsequent pixels includes at least one of a case in which a pixel of interest is a start pixel of a line, a case in which the pixel of interest has a value equal to a lower limit level of the input image, and a case in which the pixel of interest has a value equal to an upper limit level of the input image.

12. The method according to claim 7, further comprising a step of limiting the quantization error calculated in said calculation step to a numerical value within a predetermined range.

13. A non-transitory computer-readable storage medium on which is stored a computer-executable program for implementing a method for quantizing input image data executed by an image processing apparatus, the program comprising the steps of:

a bit connection step of connecting a decimal portion of corrected image data of a preceding pixel output from a latch component, to input image data of a target pixel as lower bits of the image data of the target pixel, and outputting the bit-connected image data of the target pixel, wherein the bit-connected image data has an integer portion of the image data of the target pixel and the decimal portion of image data of the preceding pixel;

a correction step of generating corrected image data of the target pixel by adding a correction value to the bit-connected image data of the target pixel;

a latch step of latching, by the latch component, a decimal portion of the corrected image data generated by the correction component of the target pixel by splitting-off, prior to performing quantization of the corrected image data, the decimal portion of the corrected image data from an integer portion of the corrected image data, output by the correction step, the split-off and latched decimal portion to be connected to the image data of the next pixel by the bit connection step, wherein the latch component does not latch the integer portion of the corrected image data of the target pixel;

a quantization step of receiving an integer portion of the corrected image data without receiving the decimal portion of the corrected image data of the target pixel, and quantizing the received integer portion of the corrected image data of the target pixel;

an inverse quantizing step of inverse-quantizing the quantized integer portion of the corrected image data of the target pixel, and outputting an inverse-quantized data of the target pixel;

a calculation step of outputting a quantization error of the target pixel based on a difference between the integer portion of the corrected image data of the target pixel and the inverse-quantized data of the target pixel;

a storing step of storing the integer portion of the calculated quantization error regarding each of the pixels, the integer portion of the calculated quantization error not including the decimal portion; and an error diffusion step of generating a correction value by diffusing the quantization error stored in said buffer, wherein the correction value to be added to the bit-connected image data of the target pixel in said correction step is generated by said error diffusion step based on the calculated quantization errors of neighboring pixels of the target pixel stored in said buffer and diffusion coefficients being smaller than 1.0.

* * * * *